May 25, 1965  F. SINGER  3,185,058
SINGLE LENS REFLEX CAMERA
Filed Jan. 31, 1963  7 Sheets-Sheet 1

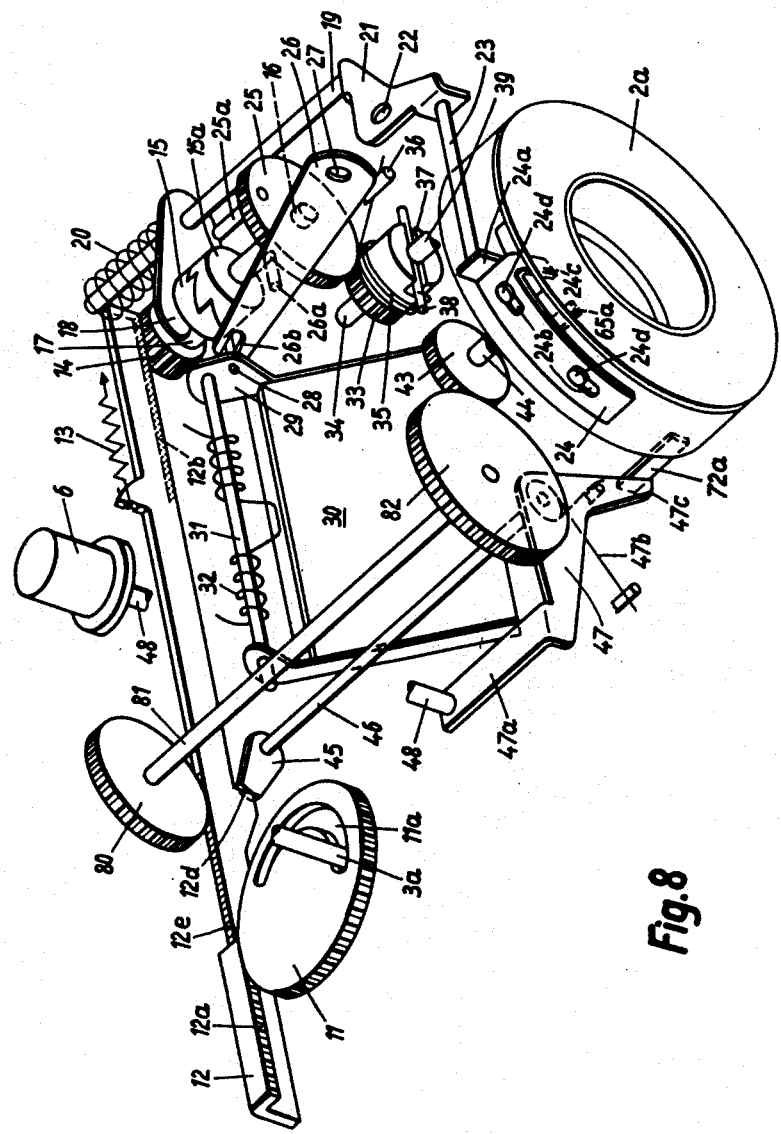

३,१८५,०५८
Patented May 25, 1965

3,185,058
SINGLE LENS REFLEX CAMERA
Franz Singer, Munich, Germany, assignor to Compur-Werk Gesellschaft mit beschränkter Haftung & Company, Munich, Germany, a company of Germany
Filed Jan. 31, 1963, Ser. No. 255,338
Claims priority, application Germany, Feb. 20, 1962,
C 26,273
13 Claims. (Cl. 95—42)

The present invention relates to a photographic camera and more particularly to a single lens type reflex camera in which the viewing mirror returns to operative position immediately after an exposure has been made.

The conventional type of single lens reflex camera includes a tiltable mirror which is swung into viewing position with the diaphragm and shutter blades in fully open position when the camera is cocked or the film is turned for the next exposure. When the exposure is made the shutter is closed, the diaphragm is shifted to its preset position and the mirror is pivoted to an inoperative position. In many prior art reflex cameras the mirror remains in this inoperative position until the camera shutter is again cocked ready for the next exposure. Obviously, it is desirable that the photographer view the scene of which the exposure has been made immediately after the exposure is completed.

There are certain types of prior art cameras in which there are provided mechanisms for moving the view finding mirror into operative position and opening the shutter immediately after an exposure is made. However, such cameras require a special shutter mechanism and do not lend themselves to mass production techniques or alternatively the mechanism required to operate the cameras occupies too great a space in the camera body.

According to the present invention there is provided a single lens reflex camera in which the viewing mirror is pivoted to operative position immediately after an exposure is made wherein the camera has a minimum number of structural parts and the mechanism occupies a minimum space within the camera body. Furthermore, a conventional objective shutter may be used which need be modified only slightly and which is controlled through only two additional coupling points.

An object of the present invention is to provide a single lens reflex camera in which the viewing mirror is positioned in operative position and the shutter is opened immediately after an exposure is taken.

A further object of the present invention is to provide an operating mechanism for a single lens reflex camera which occupies a minimum space within the camera and which requires only minor modification of a conventional objective shutter.

Figure 1:
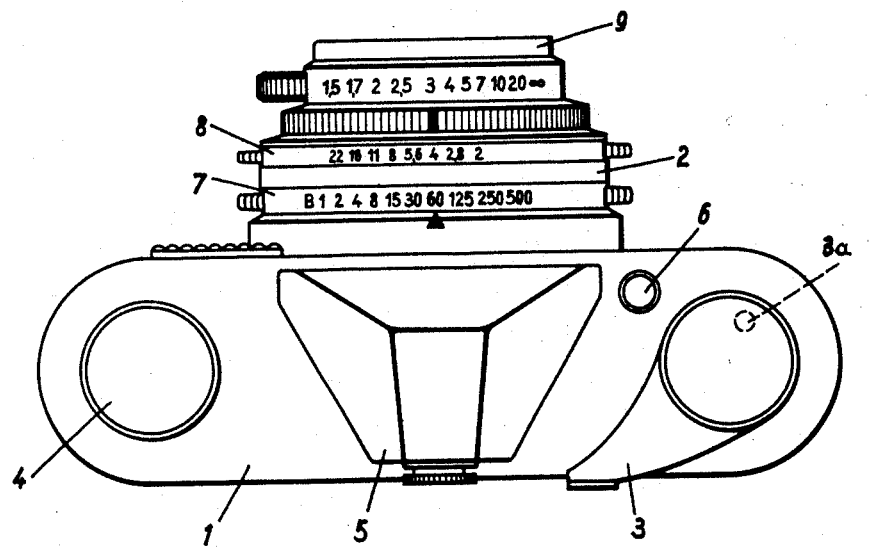
Figure 2:
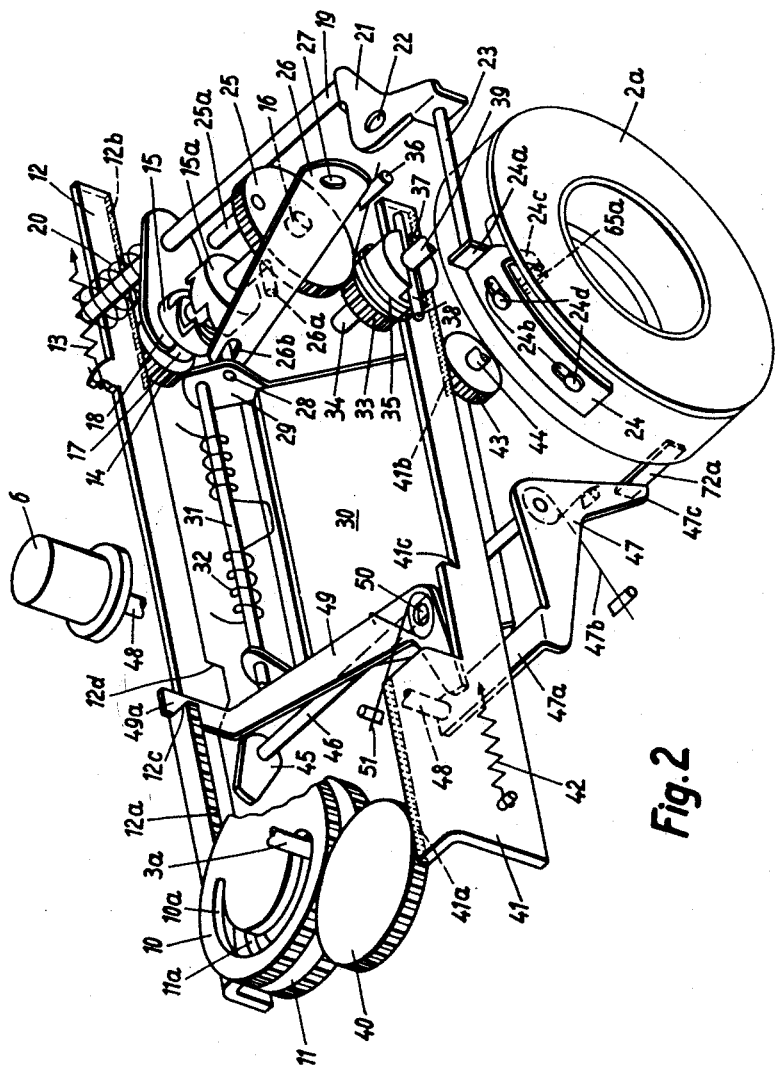
Figure 3:
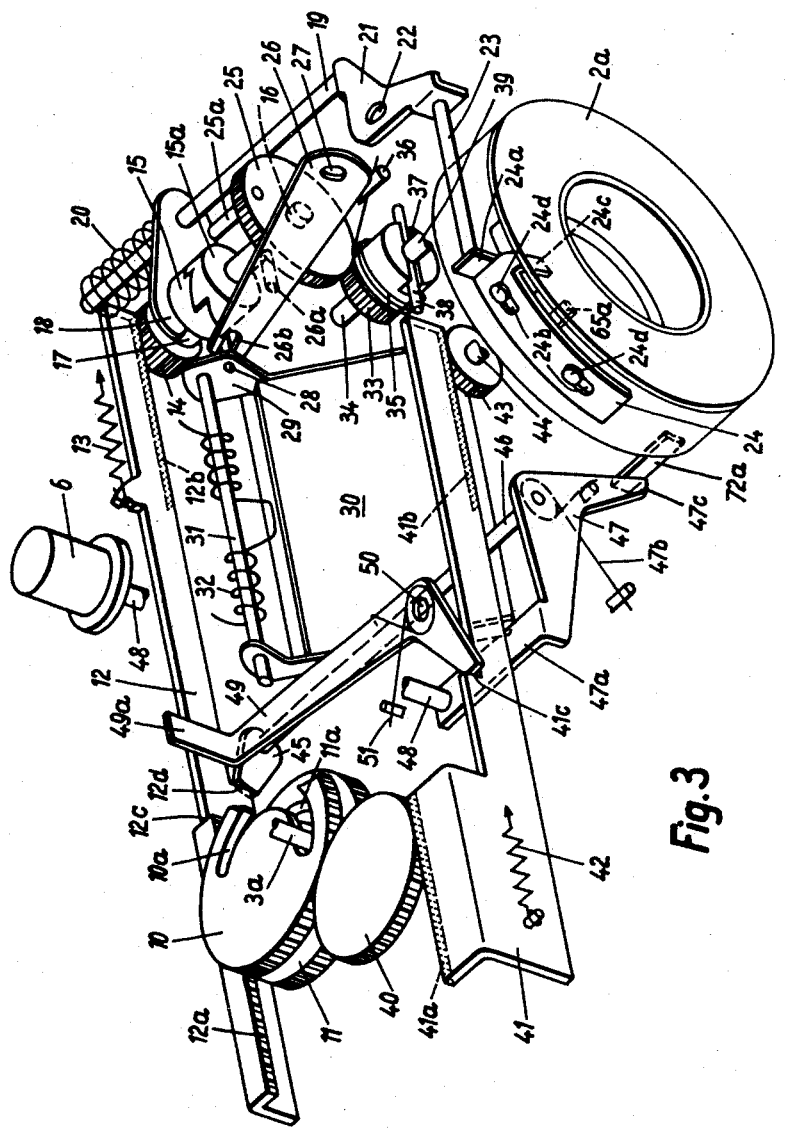
Figure 4:
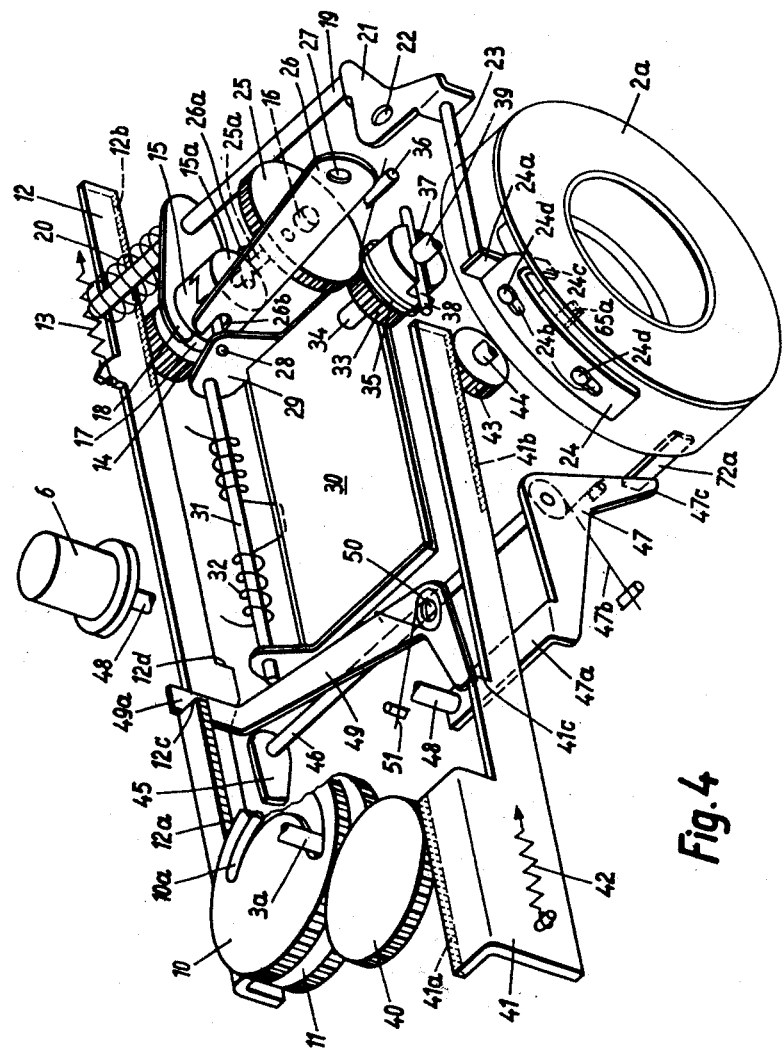
Figure 5:
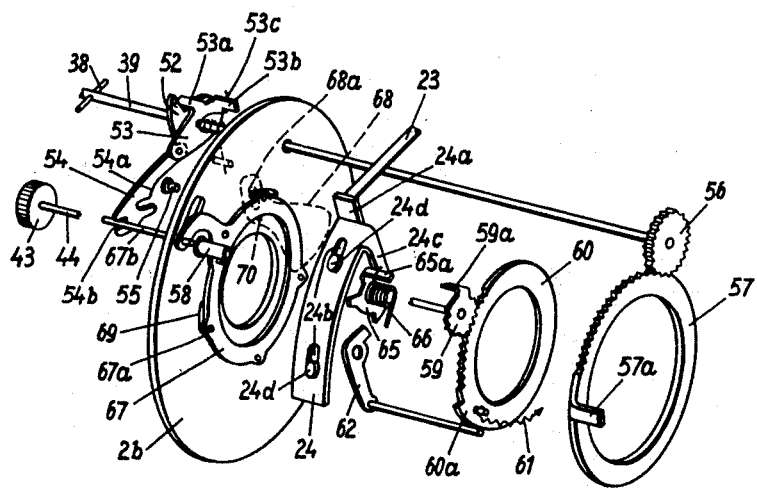
Figure 6:
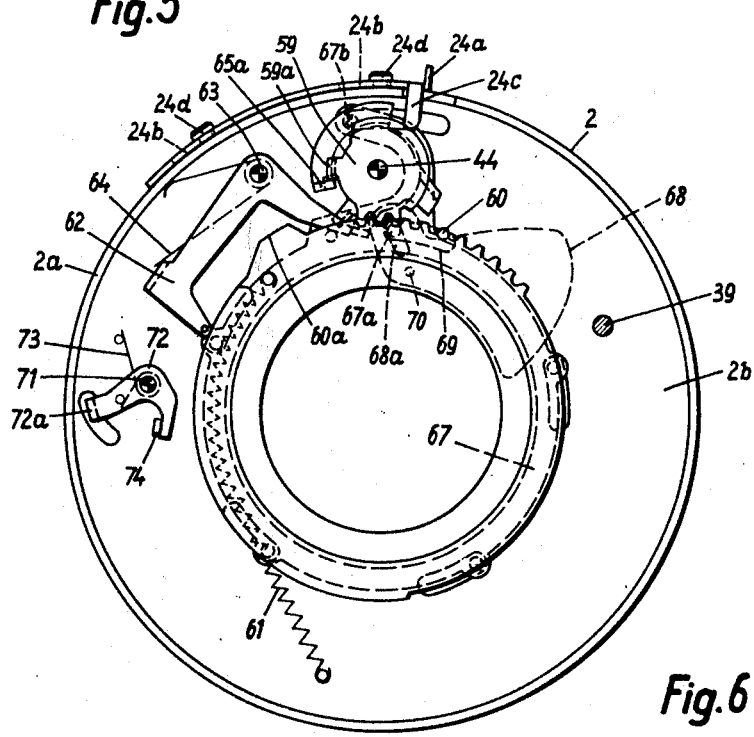
Figure 7:
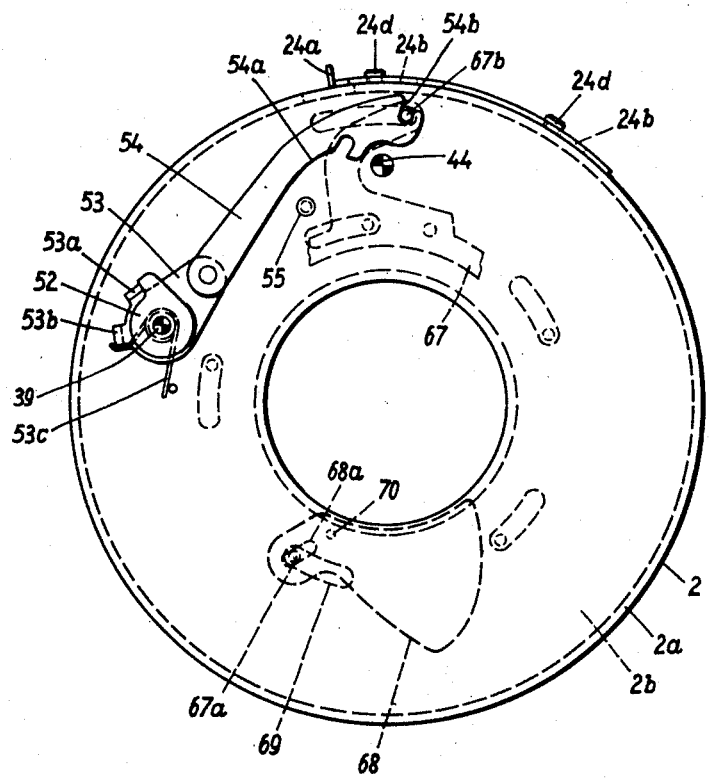

Other objects and many of the attendant advantages will become more readily apparent upon consideration of the following detailed specification in connection with the accompanying drawings wherein:

FIG. 1 is a top plan view of a single-lens reflex camera,

FIG. 2 is a perspective view of the mechanism of the reflex camera in normal position, FIG. 3 is the mechanism shown in FIG. 2 in cocked position, FIG. 4 is the mechanism shown in FIG. 2, after having partly run down, FIG. 5 is an exploded perspective view of mechanism for uncovering the camera opening, FIG. 6 is an elevational view of the shutter of a camera such as that illustrated in FIG. 1, as seen from the front of the shutter housing, FIG. 7 is an elevational view of the shutter mechanism according to FIG. 6, as seen from the back of the shutter housing, and FIG. 8 is a modification of the mechanism in the camera body.

The single-lens reflex camera illustrated in FIG. 1 comprises a camera body 1 to which is attached a shutter housing marked 2. Mounted on the top of the camera body is a lever 3 which carries a pin 3a extending into the interior of the camera body. This pin 3a engages the camera mechanism which is illustrated in FIGS. 2 to 4 in such a way that the deflection of lever 3 rotates and indexes the film and at the same time cocks the camera as well as the shutter mechanism which is shown in greater detail in FIG. 6. The top of the camera body 1 further carries a rewinding knob 4 for winding the exposed film back on to the original spool, a pentaprism 5 for viewing and a release button 6.

In conventional manner the shutter 2 is disposed within a cylindrical housing 2a having a baseplate 2b (cf. FIGS. 6 and 7) and a selector ring 7 for setting the shutter speed and a selector ring 8 for the preselection of the diaphragm aperture required for the exposure. The face of the shutter housing 2 is equipped with a push and turn adapter ring for attachment thereto of the mount 9 of an exchangeable objective lens assembly, the adapter ring and the manner in which this ring is attached to the objective is conventional and is not specifically illustrated herein. Similarly, the diaphragm is conventional and is not shown herein.

With reference first to FIG. 2 it will be seen that spur wheels 10 and 11 are mounted inside the camera box 1 coaxially with the pivot pin of lever 3. These spur wheels are formed with arcuate slots 10a and 11a respectively in which the pin 3a on lever 3 is disposed. FIG. 1 shows the lever 3 and FIG. 2 the camera mechanism in normal position of rest and it can be seen that counterclockwise deflection of lever 3 will cause a like counterclockwise rotation of the spur wheels 10 and 11 and that lever 3 can then return into its normal position without necessarily turning back the two spur wheels 10 and 11 due to the presence of slots 10a and 11a. The film winding mechanism is associated with one of the two said spur wheels 10 and 11. However, this mechanism is sufficiently well known to the art to require no detailed description and illustration.

Spur wheel 11 meshes with a rack portion 12a on a slide 12. In a manenr not shown in the drawing slide 12 is mounted parallel to the focal plane and has a second rack portion 12b engaged by a pinion 14. Finally, slide 12 has an abutment 12c as well as a locking face 12d. A tension spring 13 urges the slide in the direction indicated by the arrowed end of the spring. This latter end of the spring 13 is attached to a fixed anchorage not shown in the drawing.

Pinion 14 is attached to one member 15 of a sawtooth one-way clutch and both pinion 14 and member 15 are axially slidably and rotatably mounted on a shaft 16. Shaft 16 is parallel to the optic axis and mounted in the camera body 1 in any convenient way. A shift fork 18 embraces a neck 17 between pinion 14 and member 15 of the clutch. This shift fork is fixed on a rod 19 which is axially slidably mounted in the camera body 1 parallel to shaft 16. The rod is also loaded by a compression spring 20 one end of which bears against the shift fork 18, whereas the other end bears against a fixed face. The forward end of rod 19 bears against one arm of a bellcrank lever 21 which has a hole 22 for a pivot pin not shown in the drawing. The other arm of the bellcrank lever 21 cooperates with a transmission member arm of the bellcrank lever 21 cooperates with a transmission member 23 which is operable by the upturned end 24a of a control slide 24. This slide 24 is formed with an entraining arm 24c, and is slidably mounted on the cylindrical periphery of the shutter housing 2a by means of two slots 24b slidably guided on two pins 24d.

The other half 15a of the saw-tooth clutch and a spur wheel 25 are both secured to shaft 16 and rotatable therewith. The saw-tooth clutch is so constructed that it will transmit a clockwise torque from pinion 14 to shaft 16 when in engagement. Spur wheel 25 has an entraining pin 25a for cooperation with a pin 26a on a lever 26. Lever 26 has a hole 27 for a fixed pivot upon which the lever can turn in a plane parallel to the optic axis. The fork-shaped end 26b of lever 26 embraces a pin 28 affixed to one of the supporting plates 29 of the mirror 30. The supporting plate can swing on a shaft 31 extending parallel to the focal plane and mounted in the camera body 1 in a manner not specially shown. A twist spring 32 is coiled around shaft 31, the free ends of said spring being supported by a fixed part of the camera body, whereas a centre part urges the supporting plate 29 and the mirror 30 into viewing position.

Spur wheel 25 meshes with a pinion 33 mounted to rotate on a pin 34 fixed in the camera. Pinion 33 is formed with a transverse slot 37 containing a pin 38 which is fixed to a shaft 39 extending into the shutter housing 2. A coiled twist spring 35 having one hooked end embracing pin 38 and the other end retained by a fixed pin 36, urges pinion 33 clockwise.

The initially mentioned spur wheel 10 meshes with a second spur wheel 40 which engages the teeth of a rack portion 41a on a slide 41. Slide 41 extends across the camera body parallel to slide 12 and is also formed with a second rack portion 41b which is in mesh with a pinion 43. For reasons which will be later explained slide 41 which is urged by a tension spring 42 in the direction of the arrowed end of this spring is formed with a locking face 41c. Pinion 43 is fixedly mounted on a shaft 44 which extends into the shutter housing parallel to the optic axis.

The locking face 12d on slide 12 cooperates with a catch 45 which is fixed on a shaft 46. Shift 46 is mounted parallel to the optic axis in the camera body in bearings not shown. Fixed to the end of this shaft remote from the catch is a bellcrank lever 47. An angled lateral extension 47a of the bellcrank lever 47 supports the end of a rod 48 which extends vertically upwards through the camera body 1 to the previously mentioned release button 6. A hairpin spring 47b which bears against a fixed pin urges the bellcrank lever 47 clockwise. Arm 47c of the bellcrank lever 47 bears against an extension 72a of a lever disposed in the shutter mechanism 2 which will be described hereinafter. A locking catch 49 has a hole 50 for a pivot pin (not shown). This locking catch cooperates with the above mentioned locking face 41c and is actuated by engagement of its upended end 49a with the abutment face of slide 12 at 12c. A hairpin spring 51 urges the catch 49 counterclockwise.

Before proceeding with the further description of the following drawings it will be convenient to explain the manner in which the mechanism so far described by reference to FIGS. 2 to 4 functions.

When lever 3 is deflected counterclockwise out of its normal position shown in FIG. 1 the coupling constituted by 3a/10 and 3a/11 will entrain the two spur wheels 10 and 11, rotating them in the same direction through the same angle as that of the lever. This rotation winds the film by the length of a picture frame, and the two slides 12 and 41 are shifted out of the position illustrated in FIG. 2 to the left and into the position shown in FIG. 3. The displacement of slide 12 is accompanied by counterclockwise rotation of pinion 14. However, this rotation of the pinion is not transmitted to shaft 16 because the two members 15 and 15a of the one-way clutch do not transmit torque in this direction. At the same time the displacement of slide 12 energizes tension spring 13 and arm 49a of catch 49 is released. The displacement of slide 41 energizes tension spring 42 and imparts counterclockwise rotation to pinion 43 and shaft 44. When the two slides 12 and 41 reach the end of their movement the hairpin spring 47b urges catch 45 into engagement with the locking face 12d on slide 12, and catch 49 is urged by hairpin spring 51 into engagement with locking face 41c on slide 41. As will be later described the rotation of pinion 43 causes the shutter mechanism 2 to be cocked. FIG. 3 illustrates the position of the members of the camera mechanism when cocked. It will be seen that pin 3a has returned to the position it occupied in FIG. 2 because a restoring spring, (not shown), associated with lever 3 has returned this lever into its former position. Moreover, it will also be seen in FIG. 3 as well as in FIG. 4 that part 65a of the shutter mechanism which will be later described, has been moved out of contact with said arm 24c so that compression spring 20 is free to expand. Slide 24 to which the thrust of compression spring 20 is transmitted via parts 23, 21 and 19 and 18 will therefore yield and be pushed into its extreme left hand position, permitting the two members 15, 15a of the one-way clutch to engage.

If now the release button 6 is depressed by the operator, then this movement is transmitted by rod 48 to the bellcrank lever 47 which yields by turning counterclockwise against the resistance of hairpin spring 47b. The locking catch 45 is thus withdrawn from engagement with locking face 12d and permits slide 12 to be returned by its tension spring 13 into its position of rest or uncocked position of FIG. 2. Pinion 14 is therefore rotated in the clockwise direction and imparts its motion to shaft 16 through the engaged one-way saw-tooth clutch 15/15a. The pin 25a on spur wheel 25 which is fixed on shaft 16 is therefore carried around and after having turned through a certain angle it strikes pin 26a on lever 26, raising the latter on its fulcrum 27. Owing to the coupling between 26b and 28 lever 26 simultaneously raises the supporting plate 29 of mirror 30 against the resistance of twist spring 32 until the mirror is completely tilted out of the light path. The clockwise rotation of spur wheel 25 causes counterclockwise rotation of pinion 33 and hence of shaft 39. The twist spring 35 is energised by this rotation. As will be later explained, counterclockwise rotation of shaft 39, on the one hand, causes the shutter, which had so far been open, to close and, on the other hand, causes the diaphragm to be closed from full aperture to the aperture preselected by the setting of the diaphragm selector.

Shortly before slide 12 reaches its end position the abutment 12c on slide 12 strikes arm 49a of locking catch 49 and removes its other end from locking face 41c of slide 41. The tension spring 42 therefore pulls slide 41 to the right, rotating pinion 43 and its associated shaft 44 clockwise. The clockwise rotation of shaft 44 releases the shutter mechanism as will be later described. When the shutter has run down arm 65a of the shutter mechanism is moved by spring means against the left side of arm 24c slide 24 being thus carried from its left hand end position shown in FIGS. 3 and 4 to its right hand end position shown in FIGS. 2 and 5. This motion of the slide is transmitted by pin 23 and bellcrank lever 21 to rod 19 which is pushed rearwards agianst the resistance of compression spring 20. The shift lever 18 affixed to rod 19 carries the shiftable half 15 of the clutch with it and disengages it from the cooperating half 15a of the clutch. The disengagement of this clutch permits the twist spring 35 to unwind and to rotate pinion 33 together with shaft 39 in the clockwise direction. Since as has been explained, counterclockwise rotation of shaft 39 had caused the blades of the shutter and of the diaphragm to close, the present clockwise rotation of the shaft will restore the shutter and diaphragm blades to their former open positions.

Clockwise rotation of pinion 33 causes counterclockwise rotation of spur wheel 25. Pin 26a on lever 26 is thus released and twist spring 32 is free to return the supporting plate 29 of mirror 30 from its positon in FIG. 4 into that shown in FIGS. 2 and 3. The camera mechanism has therefore now returned into its normal positon of rest as illustrated in FIG. 2.

The following aspects of the above described functions of the camera mechanism to which reference will be made as the description proceeds are of particular significance:

a) The simultaneous cocking motions of slides 12 and 41 cause rotation of shaft 44 but shaft 16 is not affected because of the one-way nature of the clutch 15/15a. Consequently mirror 30 and mechanism associated with shaft 39 which will be later described for opening the shutter and diaphragm will remain stationary during the cocking action. The photographed object can therefore be observed through the view finder assembly comprising pentaprism 5, mirror 30 and the objective both after shutter has operated and whilst the shutter is cocked.

(b) The return of the two slides 12 and 41 causes both shafts 16 and 44 to rotate. Shaft 16 rotating before shaft 44. However, since shaft 16 is coupled with the mirror 30 and, as will be described, with a mechanism for opening and closing the shutter and diaphragm blades, these latter movements will occur before the shutter mechanism is released by the rotation of shaft 44.

(c) Part of the power stored in the energized tension spring 13 is used for energizing the twist springs 32 and 35 when slide 12 is returned. The power stored in these twist springs is freed when clutch 15/15a is disengaged, this being effected in a manner yet to be described by the shutter mechanism shortly before it has run down completely.

The connection between the camera mechanism described by reference to FIGS. 2 to 4 and the important members of the mechanism of shutter 2 which are essential to the functioning of the camera are illustrated in FIGS. 5 to 7. The above mentioned shaft 39 passes through the face of the camera body 1 parallel to the optic axis and extends to the front of the shutter housing 2. The shaft therefore passes through the baseplate 2b of the shutter. An entraining member 52 is fixed to shaft 39, and a crank 53 is loosely mounted thereon though the crank is incapable of being axially displaced. Crank 53 is formed with a lateral abutment 53a in contact with the entraining member 52. A spring 53c bears against a second abutment 53b in crank 53 and urges the latter counterclockwise. The other end of spring 53c is anchored to a pin fitted into baseplate 2b. A pusher pawl 54 is pivotably connected to crank 53 and has a cammed edge 54a which cooperates with a fixed pin 55, and at its free end it has a jaw-like recess 54b. Fixed to the forward end of shaft 39 is a pinion 56 which meshes with an actuating ring 57 rotatably mounted at the front end of the shutter housing concentrically about the optic axis. This actuating ring has an arm 57a which extends into the exchangeable objective mount and permits the control ring of the diaphragm to be moved. The manner in which the arm 57a actuates the control ring of the diaphragm is conventional and is not specifically disclosed herein.

The previously referred to shaft 44 is parallel to the optic axis as is shaft 39 and extends from the camera body 1 into the shutter housing 2 where it is mounted in bushing 58 fitted into baseplate 2b. The extreme forward end of shaft 44 carries a pinion 59 which is fixedly mounted thereon. For reasons which will be explained presently this pinion has an arm 59a and it meshes with an actuating ring 60 which is rotatably mounted concentrically with the optic axis in the shutter housing. Actuating ring 60 is urged counterclockwise by a tension spring 61 and it is formed with a projecting tooth 60a. A locking pawl 62 cooperates with tooth 60a. The pawl is pivotably mounted on a pivot pin 63 (FIG. 6) affixed to the baseplate and is urged to tilt counterclockwise by a hairpin spring 64. Apart from the above-mentioned tooth 60a the locking pawl 62 also cooperates with a shutter driving element 65 which it retains in cocked position until the shutter is released.

The shutter driving element 65 is loosely rotatably mounted on the above mentioned bushing 58 and is urged to turn clockwise by a shutter driving spring 66 coiled around said bushing 58 and anchored at its free end to a fixed point in a manner not shown herein. For cooperating on the one hand with arm 24c of control slide 24, to which reference has already been made, and on the other hand with the projecting arm 59a of pinion 59 the shutter driving element 65 has an arm 65a.

A shutter blade driving ring 67 is rotatably mounted on baseplate 2b concentrically about the optic axis and carries driving pins 67a which project through arcuate openings 69 in the baseplate. The driving pins 67a engage slots 68a in the shutter blades 68 of which only one is shown to avoid overcomplicating the drawing. Since the shutter blades 68 pivot on fixed pivot pins 70 it follows that clockwise rotation of the driving ring 67 out of the position shown in FIGS. 5 and 6 will cause the shutter blades 68 to swing in the same direction and to close the camera opening. The manner of cooperation between the main driving element 65 and the driving ring 67 is well known to the art and has been described in detail, for instance, in U.S. Patent 2,785,612. The specific disclosure of this structure is not given herein. The manner of cooperation between actuating ring 60, locking pawl 62 and the shutter driving element 65 is likewise well known and has been described in detail, for instance, in U.S. Patent 2,943,551.

A two-armed lever 72 (FIG. 6) is mounted on a pivot pin 71 which is in turn secured to baseplate 2b. The lever is urged clockwise by a hairpin spring 73 so that an extension 72a of the lever which projects through a slot in the baseplate is kept in contact with arm 47c of bellcrank lever 47. Lever 72 cooperates with an arm 74 of a locking pawl which is not specifically shown but which in a conventional manner locks the driving ring 67 in shutter open position when the speed ring 7 has been adjusted to "B" and release button 6 is depressed. For cooperating with the jaw-like recess 54b in the pusher pawl 54 the driving ring 67 is provided with a pin 67b which projects from the shutter housing through an arcuate slot in baseplate 2b.

The mechanism illustrated in FIG. 5 is in a position of rest, the shutter not having been cocked. Its position therefore corresponds with that of the camera mechanism shown in FIG. 2. As has been explained, the cocking motion of slide 12 (FIG. 2) does not affect shaft 39. On the other hand, the cocking motion of slide 41 is accompanied by counterclockwise rotation of shaft 44. The arm 65a of the shutter driving element 65 is entrained by arm 59a of pinion 59 and the driving element is therefore turned counterclockwise and winds up the shutter driving spring 66. Since the counterclockwise rotation of pinion 59 also causes clockwise rotation of actuating ring 60 against the resistance of tension spring 61, tooth 60a loses contact with the cooperating arm of locking pawl 62. The restoring power of the hairpin spring 64 turns the locking pawl 62 counterclockwise into position for interception of a projection of the shutter driving element 65, as soon as the latter reaches its fully cocked position. Owing to the counterclockwise rotation of the main driving element 65 arm 65a has moved away from the arm 24c of slide 24. The slide 24 therefore yields to the power of compression spring 20 (FIG. 2) and moves to the left. The two members 15 and 15a of the clutch are thus allowed to engage, but a counterclockwise torque (in FIG. 2) is not transmitted to shaft 16. When locking pawl 62 snaps into engagement the cocking action of the mechanisms illustrated in FIGS. 2 to 7 is completed.

If it is now intended to take a photograph, mirror 30, the shutter blades 68 and the diaphragm blades which are not shown in the drawings must be moved into suitable positions in which the mirror 30 is withdrawn from the light path, the shutter mechanism 2 is ready for operation and the diaphragm is set to the selected aperture. The following description will now explain the manner in which the shutter, which in FIG. 5 is open, is first closed and finally actuated to make the exposure.

In this context it is to be noted that:

(a) After depression of the release button 6 slide 12 is moved by tension spring 13, imparting counterclockwise rotation to pinion 33 and hence to shaft 39 (in FIGS. 2 to 5).

(b) That mirror 30 is simultaneously tilted out of its position shown in FIGS. 2 and 3 into the position shown in FIG. 4, causing the twist spring 32 to be energized.

Owing to the rotation of shaft 39, clockwise in FIGS. 2 to 5 and counterclockwise in FIG. 7, crank 53 is urged to participate in this rotation by its biasing spring 53c. A combination motion is thus imparted to the pusher pawl 54 in such manner that pin 67b will be moved clockwise in FIG. 5 and counterclockwise in FIG. 7. The driving ring 67 is therefore rotated in the same direction, causing the shutter blades 68 to swing on their pivot pins 70 clockwise in FIGS. 5 and 6 and counterclockwise in FIG. 7 until the camera opening is closed. At the end of the above described motions the driving ring 67 is in its proper starting position for effecting the subsequent exposure. At the same time the jaw-like recess 54b in the pusher pawl 54 releases pin 67b, the cammed edge 54a riding on to the fixed pin 55. The connection between shaft 39 and the driving ring is thus broken and the driving ring can subsequently be driven by the shutter driving element 65 for making the exposure. The rotation of shaft 39 has also caused pinion 56 to impart rotation in the opposite hand to actuating ring 57 which, in a manner known to the art and requiring no explanation herein, closes the diaphragm blades to the aperture which had been preselected. The camera is now ready for making the exposure and all that remains to be done is to release the shutter. As already stated this is effected by the disengagement of locking pawl 62.

The return motion of slide 41 imparts clockwise rotation to shaft 44 in FIGS. 2 to 6 and the actuating ring 60 therefore rotates counterclockwise. Tension spring 42 is assisted by the power of tension spring 61. In the course of the rotation of actuating ring 60 tooth 60a rides under the cooperating arm of locking pawl 62 which is therefore deflected clockwise in FIGS. 5 and 6 and releases the shutter driving element 65.

The shutter driving element 65 is now rotated clockwise (in FIGS. 5 and 6) by the power of the shutter driving spring 66 and turns the driving ring 67 first counter to and then in the clockwise direction. The shutter blades 68 are thus likewise first swung counterclockwise about their pivot pins 70 until the full aperture has been uncovered and they are then swung back in the opposite direction until the uncovered opening has been completely reclosed. The manner of cooperation between the shutter driving element 65 and the driving ring 67 is well known to the art and has been described in greater detail in U.S. Patent 2,785,612, and further explanations in the present specification will not be required. When the exposure has been made the shutter blades 68 and the blades of the diaphragm which is not shown in the accompanying drawings must again be opened, and the mirror 30 must be lowered into the light path. This is effected as will now be described:

Just before the shutter driving element 65 finally comes to rest arm 65a strikes the cooperating arm 24c of slide 24 which is in the position shown in FIG. 3. The power of the shutter driving spring 66 pushes the slide 24 into the position shown in FIG. 2 and thereby causes the members 15 and 15a of the one-way clutch to disengage. The power stored in twist spring 35 is thus released and pinion 33 is freed to rotate on shaft 39 clockwise in FIGS. 2 to 5 and counterclockwise in FIG. 7. Spur wheel 25 thus rotates counterclockwise and its pin 25a releases the cooperating pin 26a on lever 26. Twist spring 32 can therefore now return the carrier plate 29 of mirror 30 from its position in FIG. 4 into that shown in FIGS. 2 and 3.

The rotation of shaft 39 in the counterclockwise direction in FIG. 7 produces a like counterclockwise rotation of crank 53 in FIG. 7. The pusher pawl which is displaced by the crank rides with its cammed edge 54a up pin 55 until the jaw-like recess 54b embraces pin 67b of driving ring 67. When the connection between the pusher pawl 54 and pin 67b has been re-established the continued rotation of shaft 39 causes pin 67b to be pushed from its extreme left into its extreme right hand position in FIG. 7. This is tantamount in FIG. 7 to clockwise rotation of the driving ring 6. Since the direction of swing of the shutter blades 68 agrees with the hand of rotation of the driving ring, it will be understood that the camera aperture which had been closed will now be reopened. The camera mechanism and the shutter mechanism 2 cooperating therewith are therefore both returned into the positions illustrated in FIGS. 2 and 5 to 7 in which the operator can again view the photographed object.

The camera mechanism illustrated in FIG. 8 is a modification of the mechanism which has already been described by reference to FIGS. 2 to 4. FIG. 8 shows this mechanism when cocked and the drawing therefore corresponds to the position of the previously described mechanism as illustrated in FIG. 3. In FIG. 8 slide 12 is formed with an additional rack section 12e which meshes with a spur wheel 80. Spur wheel 80 is fixed to a shaft 81 extending parallel with the optic axis and mounted in the camera body 1 in some convenient way which permits no axial displacement. A further spur wheel 82 which is likewise fixed to shaft 81 meshes with the previously described pinion 43. Although the modified mechanism shown in FIG. 8 lacks several parts and is therefore simpler than the embodiment previously described, shaft 44 is coupled by rigid transmission means with slide 12 and a gear stage between slide 12 and shaft 44 is absent. Moreover, the delay in time between the activation of shaft 39 and that of shaft 44 is likewise absent. This necessitates the provision of a particular transmission ratio between slide 12 and shaft 44. If this cannot be provided for spatial reasons, then the arrangement illustrated in FIGS. 2 to 4 is the only one feasible. The manner in which the modified mechanism in FIG. 8 cooperates with the mechanism illustrated in FIGS. 5 to 7 is the same as in the case of the mechanism shown in FIGS. 2 to 4.

Obviously, many modifications and variations of the prevent invention are possible in light of the above teachings. What is claimed as new and is desired to be secured by Letters Patent is:

1. A reflex camera of the single lens type having a conventional shutter, adjustable diaphragm, shutter actuating means and film winding means, comprising, in combination, means coupled to said film winding means for cocking the shutter actuating means, a mirror, means for pivoting the mirror from an operative viewing position to an inoperative position and for shifting the shutter from an open to a closed position and for simultaneously shifting the diaphragm from an open to a preset adjusted position, spring means urging the mirror into the operative position thereof and for urging the shutter and diaphragm into open positions, means coupled to said film winding means for actuating said mirror pivoting means and said shutter shifting means, clutch means included in said actuating means, means operatively interconnecting said clutch means and the shutter actuating means for engaging the clutch when the shutter is cocked and for disengaging the clutch when the shutter is run down whereby the mirror is swung to an inoperative position, the shutter closed and the diaphragm moved to a preset position when an exposure is made by said actuating means through the engaged clutch and, after the shutter has run down, the clutch is disengaged and the spring means moves the mirror to operative position and the shutter and diaphragm to open positions.

2. A reflex camera according to claim 1 wherein said means connected to said film winding means for actuating said mirror pivoting means and said shutter shifting means comprises a slide having a rack in engagement with a spur wheel driven by said film winding means, a second rack on said slide for driving said mirror pivoting means and said shutter shifting means.

3. A single lens reflex camera including a shutter, an adjustable diaphragm, shutter actuating means for making an exposure, film winding means, means connected to said film winding means for cocking said shutter actuating means, a mirror, means for pivoting the mirror from an operative viewing position to an inoperative position, first spring means urging said mirror into the operative position thereof, means for shifting the shutter from an open to a closed position and for simultaneously shifting the diaphragm from an open to a preset adjusted position, second spring means urging the shutter and diaphragm into open positions, means connected to said film winding means for actuating said mirror pivoting means and said shutter shifting means, clutch means operatively disposed between said last named means and said mirror pivoting means and said shutter shifting means, means operatively interconnecting said clutch means and said shutter actuating means for engaging said clutch when the shutter is cocked and, for disengaging the clutch when the shutter is run down whereby the mirror is swung to an inoperative position, the shutter closed and the diaphragm moved to a preset position when an exposure is made by the actuating means through the engaged clutch and, after the shutter has run down, the clutch is disengaged and the first spring means moves the mirror to operative position and the second spring means moves the shutter and diaphragm to open positions.

4. A single lens reflex camera according to claim 3 wherein said means for actuating said mirror pivoting means and said shutter shifting means includes a slide driven by said film winding means, a spring energized by movement of said slide to a cocked position, latch means retaining said slide in a cocked position, and means for releasing said latch means and subsequently releasing the shutter actuating means.

5. A single lens reflex camera having a shutter and diaphragm comprising film winding means, a slide driven by said film winding means, a spring energized by movement of said slide to a cocked position, a pinion driven by said slide, a mirror pivotal between operative and inoperative positions, a spur wheel operatively associated with said mirror, means including a clutch interconnecting the spur wheel and pinion whereby rotation of the pinion rotates the spur wheel to raise the mirror into inoperative position when said clutch is engaged, first spring means for urging the mirror into operative position, the spring means being energized by movement of the mirror into inoperative position, shaft means driven by said spur wheel for closing the shutter and releasing the diaphragm to a preset position thereof when the spur wheel is rotated, second spring means for driving said shaft means to open the shutter and diaphragm, said second spring means being energized by rotation of the shaft means by said spur wheel to close the shutter, means for cocking the shutter when the film winding means is actuated, means moved in response to cocking of the shutter for engaging said clutch, said last named means disengaging said clutch when the shutter has run down, said first and second spring means being operative to drive said mirror to operative position and said diaphragm and shutter to open positions respectively when the clutch is disengaged, and means for releasing said slide and said shutter from cocked position whereby the shutter is closed, the diaphragm moved to preset position and the mirror is moved to inoperative position, the shutter is opened and closed for the exposure and immediately thereafter the mirror is moved to operative position and the shutter and diaphragm are opened.

6. A single lens reflex camera according to claim 5 wherein said means for cocking the shutter comprises a second slide driven by said film winding means, a spring energized by movement of said second slide to a cocked position, and latch means for releasing said first and second slides in predetermined timed relation whereby sequentially the shutter is closed and the diaphragm moved to adjusted preset position, the mirror pivoted to inoperative position and the shutter opened and closed to make an exposure.

7. A single lens reflex camera including a shutter, an adjustable diaphragm, shutter actuating means for making an exposure, film winding means, means connected to said film winding means for cocking said shutter actuating means, a mirror, a rod pivotally mounting said mirror to swing between an operative and an inoperative position, a first spring engaging said mirror to urge the mirror into operative position, a pivoted lever engaging said mirror, a rotatable shaft disposed adjacent said lever, means on said shaft engageable with the lever whereby upon rotation of the shaft the mirror is swung to an inoperative position, a clutch, one of the clutch members being mounted on said shaft, a pinion connected to the other clutch member, a slide in operative engagement with said pinion and said film winding means, a second spring energized by actuation of said film winding means and movement of said slide, means interconnecting the shutter actuating means and the clutch for engaging the clutch when the shutter is cocked and for disengaging the clutch when the shutter has run down whereby upon release of the slide from cocked position when the shutter is cocked the second spring returns the slide to uncocked position thereby rotating the pinion and the shaft through said clutch to swing the mirror to inoperative position and when the shutter is run down the clutch is disengaged whereby the first spring swings the mirror to operative position.

8. A single lens reflex camera including a shutter, an adjustable diaphragm, shutter actuating means for making an exposure, film winding means, means connected to said film winding means for cocking said shutter actuating means, a slide having a rack thereon engaged with said film winding means, a pinion, a second rack on said slide engaging said pinion, a clutch comprising a pair of clutch members, one of said clutch members being connected to said pinion, a shaft, the other clutch member being mounted on said shaft, a pinion driven by rotation of said shaft, an actuating ring rotated by said pinion, said actuating ring adapted to shift said adjustable diaphragm between fully open and a preset position, a shutter blade driving ring, means on said shaft for operative engagement with said blade driving ring for rotating said ring to move the shutter between open and closed positions, means actuated by shutter cocking means for engaging said clutch when the shutter is cocked and for disengaging said clutch when the shutter is run down, whereby when the shutter is cocked and the clutch engaged and the slide moved to rotate the pinion, the shaft is rotated and the diaphragm moved to preset position and the shutter closed and spring means operatively associated with said shaft and energized by rotation of the shaft in one direction by the pinion to rotate the shaft in the opposite direction after the shutter is run down and the clutch disengaged to open the shutter and diaphragm.

9. A single lens reflex camera having a shutter and diaphragm comprising film winding means, means for cocking the shutter, means for releasing the cocked shutter, a slide driven by said film winding means from a normal to a cocked position, a spring energized by movement of said slide to a cocked position urging said slide to the normal position, a pinion driven by said slide, a mirror pivotal between operative and inoperative positions, means interconnecting said pinion and mirror to shift the mirror to inoperative position when the pinion is driven by release of the slide from cocked position, said means including a clutch, means connecting said clutch to said shutter, cocking means to engage the clutch when the shutter is cocked and to disengage the clutch when the shutter is run down and latch means for retaining the slide in cocked position, said latch means interconnected with the means for releasing the cocked shutter whereby the latch means and shutter are released in predetermined timed sequence.

10. A single lens reflex camera according to claim 9 wherein said means for cocking the shutter includes a rack on said slide and a pinion in engagement with said rack.

11. A single lens reflex camera according to claim 9 wherein said means for cocking the shutter includes a second slide driven by said film winding means and a pinion in engagement with said second slide.

12. In a single lens reflex camera including a shutter, an adjustable diaphragm, film winding means, a first slide in engagement with said film winding means and adapted to move between cocked and normal positions, first and second shoulders on said first slide, a rack on said slide, a first spring energized by movement of said first slide to a cocked position urging the first slide to a normal position, a pinion in engagement with said rack, mirror pivoting and shutter closing means driven by said pinion, a second slide in engagement with said film winding means and adapted to move between cocked and normal positions, shutter cocking and actuating means driven by said second slide, a second spring energized by movement of said second slide to urge the second slide into the normal position thereof, a shoulder on said second slide, latch means engaging said first shoulder on said first slide to retain the first slide in cocked position, a locking catch pivotally mounted and spring urged to engage the shoulder on the second slide in cocked position, the second shoulder on said first slide adapted to engage the locking catch to release the second slide in the movement of the first slide from cocked to normal position whereby the shutter is closed and the mirror pivoted prior to actuation of the shutter.

13. A single lens reflex camera according to claim 12 wherein a clutch is operatively connected with said pinion, said clutch being engaged when the shutter is cocked and being disengaged when the shutter has run down.

References Cited by the Examiner
UNITED STATES PATENTS 2,730,025   1/56   Faulhaber _____ 95—42
3,074,333   1/63   Hahn _____ 95—42

NORTON ANSHER, *Primary Examiner.*

JOHN M. HORAN, *Examiner.*